Aug. 3, 1965 D. H. ALDEBORGH 3,197,877
ADJUSTABLE SETTING MASTER FOR DIAL DEPTH GAGES
Filed Feb. 15, 1963
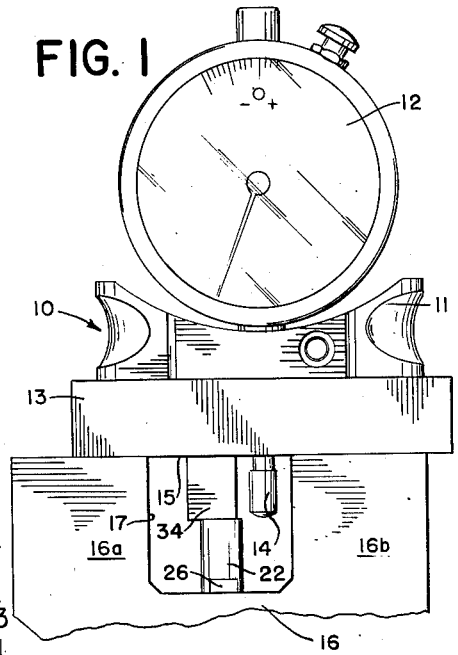
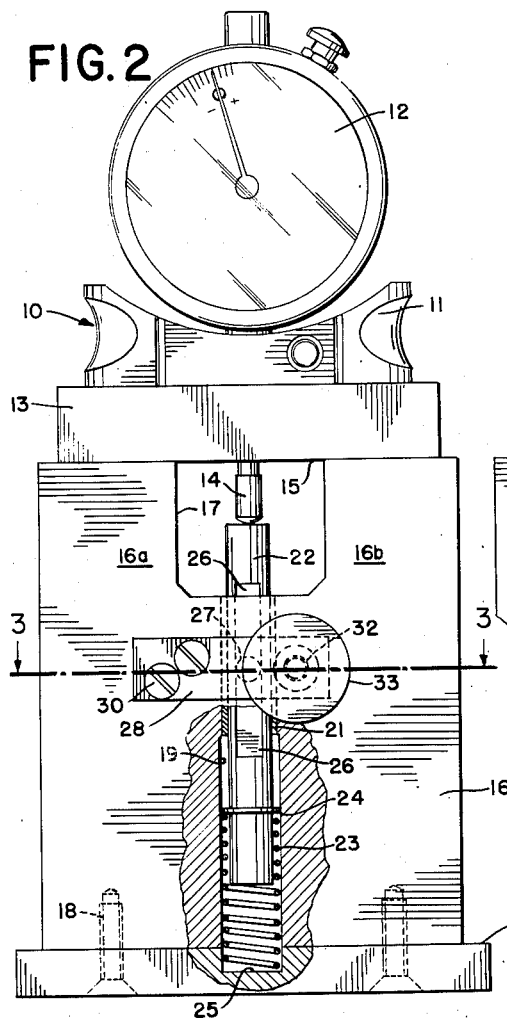
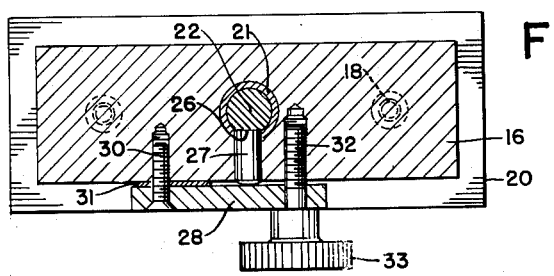
INVENTOR.
DAVID H. ALDEBORGH
BY
ATTORNEYS

United States Patent Office 3,197,877
Patented Aug. 3, 1965

3,197,877
ADJUSTABLE SETTING MASTER FOR DIAL
DEPTH GAGES
David H. Aldeborgh, Poughkeepsie, N.Y., assignor to
Standard Gage Company, Inc., Poughkeepsie, N.Y., a
corporation of New York
Filed Feb. 15, 1963, Ser. No. 258,882
9 Claims. (Cl. 33—169)

The present invention relates to setting masters for dial depth gages and particularly to an adjustable setting master which makes it possible to set a dial depth gage to measure depths over a considerable range. In order to set dial depth gages it is common practice at the present time to utilize master gages which are not adjustable, thus requiring a master for each depth setting.

By means of the present invention a setting master is provided which can be utilized together with a standard set of gage blocks to set a dial depth gage to any desired setting and which can, in fact, when once set, be utilized to set a plurality of dial gages to the particular desired setting.

It is an object of the invention to provide a means for setting a dial depth gage to a desired setting in accordance with the requirements of a workpiece, the gage being set in the usual manner to measure a depth which is specified for the production piece, the gage being utilized being one which is readable to the degree of tolerance specified for the particular production piece.

It is another object of the invention to provide such a setting means which is adjustable and which may readily be set to a desired adjusted position and retained in that position to thereby serve as a master for setting a gage to thereafter be used for measuring depths of recesses, etc. in workpieces.

It is another object of the invention to provide a locking means for the movable element of the setting master which locks the movable element into position without disturbing the setting, thus assuring the accuracy of the setting of the dial depth gage.

Other objects and features of the invention will be apparent when the following description is considered in connection with the annexed drawings, in which, FIGURE 1 is a fragmentary front elevational view showing the adjustable setting master of my invention with a dial depth gage in position thereon and with gage blocks in place between the gaging surface of the dial depth gage and the movable element of the setting master;

FIGURE 2 is a front elevational view similar to FIGURE 1 but showing the entire adjustable setting master with a portion broken away to show the internal construction; and FIGURE 3 is a horizontal cross-sectional view taken on the plane of the line 3—3 of FIGURE 2.

Referring now to the drawing, there is shown at 10 the usual dial depth gage which comprises the clamping element 11, the dial indicator 12 and the gaging block or knife edge 13. As is well known the contact point 14, fixed to the indicator plunger or spindle, extends beneath the lower finished surface 15 of the block 13 and serves to measure the distance between the contact point 14 and the lower surface 15 of the block 13.

The setting master of my invention comprises a metallic block 16 having a recess 17 formed therein centrally of the upper portion thereof forming upwardly extending arms 16a and 16b the uppermost surfaces of which are finished to form flat coplanar surfaces. Mounted on the lower surface of the block 16 by any suitable means such as the screws 18 is a base member 20 which serves as a support for the device during use.

A vertical bore 19 is formed in the block extending from the bottom of the recess 17 entirely through the block. In this bore there is mounted a bushing 21 which extends from the bottom of the recess 17 downwardly terminating about midway of the bore. Slidably mounted in the bushing 21 is a plunger 22 which is urged upwardly by means of the spring 23 which extends between a collar 24 on the plunger 22 and the bottom of a blind bore 25 in the base 20.

As is clearly shown in FIGURES 2 and 3, the plunger 22 is provided with a flat 26 extending along one side thereof. A small plunger 27 of cylindrical form having a flat end is mounted in a horizontal bore extending from the front of block 16 into the bore 19 and through the bushing 21. The flat end of this plunger engages the flat 26 of plunger 22 and thus serves to lock that plunger in its adjusted position.

Plunger 27 has pressure exerted upon it by means of a clamp comprising a bar 28 which is fixed to the block 16 in a resilient manner by the use of screws 30 which thread into the block and by means of a resilient washer member 31 of neoprene or the like. Additionally, a clamping screw 32, having a kurled head 33, is threaded into the block 16 and extends through a clearance hole in the bar 28. As will be clear from FIGURE 3, when screw 33 is rotated in a clockwise direction, the bar 28 will pivot upon the screws 30 and will bear against the outer rounded end of plunger 27 thus exerting a pressure against the flat surface 26 of the plunger 22.

As indicated in FIGURE 1, when the setting master is to be adjusted the knurled head 33 of the clamping screw 32 is rotated to loosen the clamp and thereafter a stack of gaging blocks such as Hoke or Johansson blocks 34 is inserted between the lower surface 15 of a dial depth gage, or any other straight edge, which is placed upon the upper surfaces of the arms 16a and 16b of block 16 and extends over the top of the recess 17, and the top of the plunger 22 of the setting master. It will of course be understood that the plunger is depressed by the blocks to the extent necessary to insert them in the position shown in FIGURE 1. Thereupon the clamping screw 32 is tightened and the plunger 22 thus held in its adjusted position, the clamping means described serving to permit this clamping without disturbing the setting.

Now the dial depth gage is placed in the position shown in FIGURE 2 with the indicator contact point resting upon the upper surface of plunger 22 which is of course understood to be an accurate flat surface parallel to the flat upper surfaces of the block 16. The bezel of the dial indicator is then rotated until the zero point of the scale is in alignment with the indicator hand and the depth gage is set for measuring pieces to determine whether recesses therein come within the specifications and tolerances desired.

It will of course be understood that the dial indicator is clamped in the member 11 and the contact point 14 chosen to be of such length that the contact point extends a distance below the surface 15 which is compatible with the tolerance limits for the depth to be gaged and with the range of the dial indicator. The gaging of a desired depth and measurement of the amount of variation therefrom in either direction to determine whether the piece falls within a predetermined tolerance or does not, is performed while utilizing the most accurate portion of the range of the indicator and with the indicator scale in a convenient position.

While I have described a preferred embodiment of the invention, it will be understood that I wish to be limited not by the foregoing description, but solely by the claims granted to me.

What is claimed is:

1. In a setting master for dial depth gages, in combination, a block having a flat finished surface thereon, means supporting said block with said flat finished surface facing upwardly, a recess in said surface, a bore through said block extending perpendicular to said flat surface and terminating in said recess, a setting plunger having a flat face parallel to said flat surface mounted in said bore for reciprocation only, said plunger being reciprocable to an extent such that its flat face lies in the plane of said flat surface, spring means for urging said plunger toward said surface, and means for clamping said plunger in an adjusted position whereby said plunger may be set by means of gage blocks to a position with its face placed a predetermined distance from said flat surface and a dial depth gage thereafter set to a desired measurement by placing its contact surface in engagement with said flat surface and its contact point in engagement with said plunger face.

2. A setting master for dial depth gages as claimed in claim 1 wherein said clamping means comprises a flat surface extending longitudinally of said plunger, a bore extending through said block and into said plunger bore, said bore extending at substantially right angles to said plunger bore and means comprising a clamping plunger having a flat face extending through said second bore into position to engage the longitudinally extending flat surface of said setting plunger, to thereby clamp said setting plunger in an adjusted position.

3. A device as claimed in claim 2 wherein a pressure bar is mounted on the face of said block and extends into contact with the end of said clamping plunger opposite said flat longitudinally extending surface and wherein means are provided for pressing said arm against said clamping plunger end.

4. A device as claimed in claim 3 wherein said pressure bar is resiliently mounted on said block, said resilient mounting comprising a resilient washer inserted between said bar and said block.

5. A device in accordance with claim 3 wherein said means for pressing said arm against said clamping plunger end comprises a screw passing through a clearance hole in an extension of said bar, said screw being threaded into said block whereby operation of said screw will exert pressure against said bar and against said setting plunger.

6. A device in accordance with claim 4 wherein said resilient washer is in the form of a neoprene spacer.

7. A device in accordance with claim 1 wherein said block is substantially rectangular in cross-section and wherein said recess comprises a slot extending from one side of said rectangular block to the other whereby said flat surface is divided into two parts.

8. A device in accordance with claim 1 wherein said setting plunger has a collar fixed thereto, and wherein said spring pressure is provided by a spring extending from said collar to the bottom of said setting plunger bore.

9. A device as claimed in claim 8 wherein a bushing is inserted in the upper end of said bore and wherein said collar is of a diameter substantially equal to the outer diameter of said bushing, said bushing and collar thereby cooperating to limit the movement of said setting plunger into said recess.

References Cited by the Examiner
UNITED STATES PATENTS

| | | | |
|---|---|---|---|
| 642,750 | 2/00 | Nielson | 33—169 X |
| 769,196 | 9/04 | Spalding | 33—169 |
| 1,020,020 | 3/12 | Brawley | 33—178 |
| 1,090,180 | 3/14 | Wells | 33—167 X |
| 1,235,785 | 8/17 | Fishel | 33—169 |
| 1,568,295 | 1/25 | Schleicker | 33—169 |
| 2,466,185 | 4/49 | Stoothoff | 33—169 |
| 2,520,022 | 8/50 | Vobeda | 33—170 |
| 2,548,010 | 4/51 | Frisz | 33—178 |
| 2,672,500 | 3/54 | Bondon | 85—1 X |
| 2,883,755 | 4/59 | Lovenston | 33—172 |
| 2,933,815 | 4/60 | Caplinski | 33—143 |
| 2,979,827 | 4/61 | Fronk | 33—174 |

ISAAC LISANN, *Primary Examiner.*